United States Patent [19]

Cherbuy

[11] Patent Number: 4,688,434
[45] Date of Patent: Aug. 25, 1987

[54] METHOD FOR ADJUSTING A RESISTANCE-GAGE FORCE TRANSDUCER AND AN ADJUSTED FORCE TRANSDUCER THUS OBTAINED

[75] Inventor: Jean Cherbuy, Nice, France

[73] Assignee: Sfernice Societe Francaise de l'Electro-Resistance, Paris, France

[21] Appl. No.: 848,289

[22] Filed: Apr. 4, 1986

[30] Foreign Application Priority Data

Apr. 9, 1985 [FR] France ............................... 8505337

[51] Int. Cl.$^4$ .............................................. G01L 1/22
[52] U.S. Cl. ................................... 73/862.65; 73/765; 338/195
[58] Field of Search ................ 73/765, 862.65, 862.66, 73/1 B; 338/2, 5, 195

[56] References Cited

U.S. PATENT DOCUMENTS 3,949,603 4/1976 Laimins ............................. 73/862.66
4,342,217 8/1982 Paetow ................................. 73/1 B
4,565,255 1/1986 Sarrazin ....................... 73/862.61 X

FOREIGN PATENT DOCUMENTS 0067664 12/1982 European Pat. Off. .
0089209 9/1983 European Pat. Off. .

Primary Examiner—Charles A. Ruehl
Attorney, Agent, or Firm—Young & Thompson

[57] ABSTRACT

A force transducer comprises a resilient bar (1) which carries a measuring bridge formed by resistance gages ($R_1, \ldots R_4$). One end of the bar is attached to a stationary support (2) and the other end is subjected to a force (P) to be measured. A method for ensuring that the signal delivered by the measuring bridge is proportional to the applied force and insensitive to parasitic couples consists in determining the initial characteristics of the transducer, in computing the relative errors arising from a displacement of the force (P) applied as a function of the angle made between the resistance gages ($R_1, \ldots R_4$) and the longitudinal direction ($O_x$) of the bar (1) and in cancelling these errors by making changes in one or a number of gages in order to modify the angle aforesaid.

11 Claims, 8 Drawing Figures

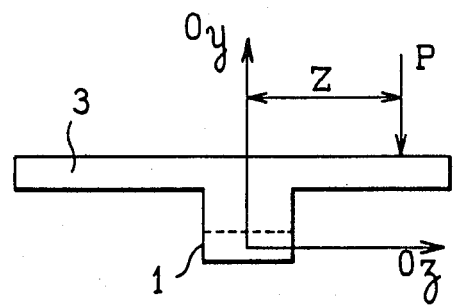
FIG_4
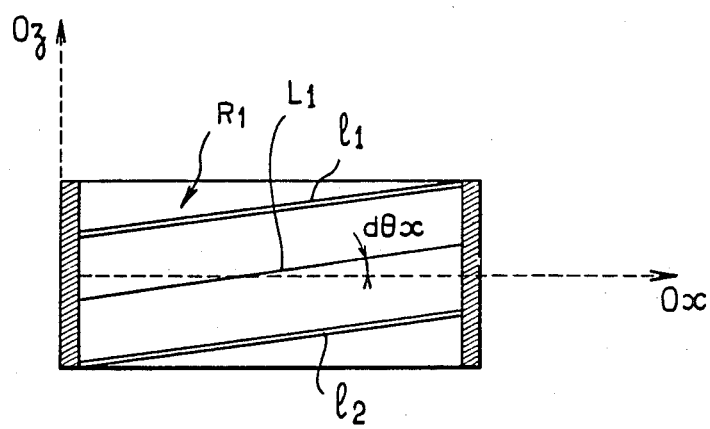
FIG_5
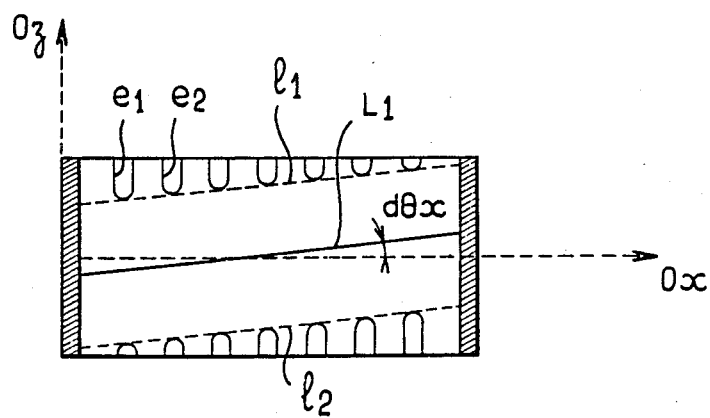
FIG_6

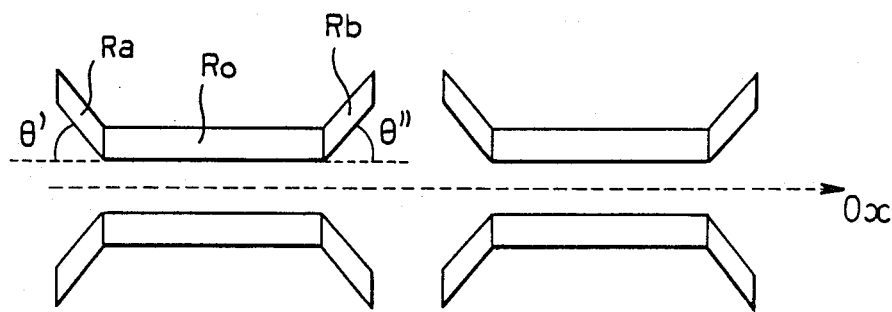
FIG_7
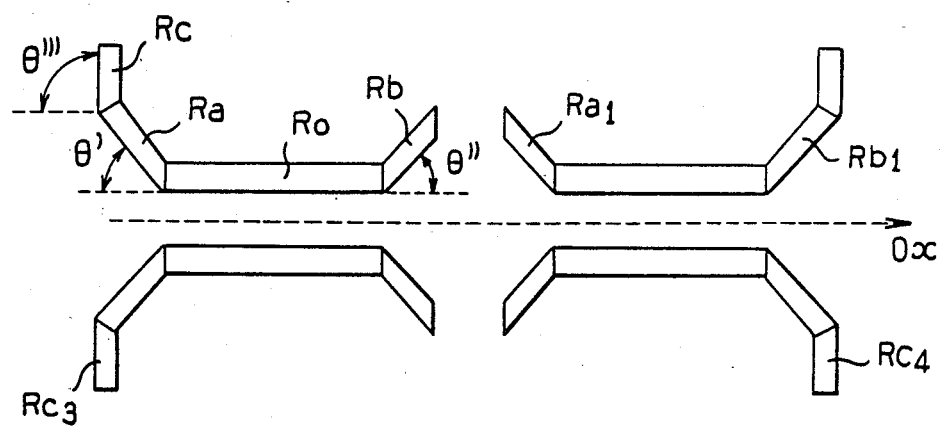
FIG_8

METHOD FOR ADJUSTING A RESISTANCE-GAGE FORCE TRANSDUCER AND AN ADJUSTED FORCE TRANSDUCER THUS OBTAINED

BACKGROUND OF THE INVENTION

1. Field of the Invention

The present invention relates to a method for adjusting a resistance-gage force transducer.

The invention is also directed to a resistance-gage force transducer which is adjusted in particular by means of the method aforesaid.

2. Description of the Prior Art

Transducers of the above-mentioned type are already known in which one end of a resilient metal bar is attached to a stationary support and the other end is subjected to the force to be measured. This force is usually applied to a plate which is parallel to the bar and connected to this latter at the end remote from the stationary support.

The fixed bar carries resistance-type strain gages which are electrically connected to each other and form a measuring bridge for delivering an electrical signal which is a function of the force applied to the plate aforesaid.

Depending on the point of application of force on the plate, said force gives rise to variable torsional and flexural couples which act on the bar to modify the value of the electrical signal delivered by the measuring bridge and thus impair the accuracy of measurement of this force.

In consequence, appropriate steps should be taken to make this measurement insensitive to the parasitic couples just mentioned, thereby ensuring that the signal delivered is constant irrespective of the point of application of the force on the plate.

Two methods are at present in use for ensuring insensitivity of measurement of force with respect to the parasitic couples aforesaid.

In a first method, the plate rests on a system of levers which summates the forces applied to the plate and transmits the resultant force on a predetermined point to the measuring device.

In a second method, the plate is attached directly to a transducer which is often of highly complex shape so designed as to minimize the effect of the parasitic couples or moments. The transducer is usually adjusted by means of mechanical actions in order to eliminate residual effects of the parasitic moments.

In the method described in French patent No. 82 20040, an attempt has been made to solve the difficulties noted in the foregoing by eliminating the parasitic torsion signal generated at the time of application of force on the plate by means of one or a number of torsion strain gages and additional resistors of suitable design which are inserted in the signal-processing circuit.

However, this method does not permit elimination of the parasitic signal which is related to the displacement of the point of application of the force in a direction parallel to the axis of the resilient bar.

SUMMARY OF THE INVENTION

The aim of the present invention is to provide a method for adjusting the force transducer in such a manner as to ensure that the electrical measurement signal is insensitive to the torsional and flexural couples generated by displacements of the point of application of the force to be measured, said method being simple to carry out and readily adaptable to automatic operation.

In accordance with the invention, said method is distinguished by the following steps:

A. Determination of the initial characteristics of the transducer.

B. Computation of the relative errors of the transducer arising from a displacement of the applied force as a function of the angle $\theta$ formed between the resistance gages and the longitudinal direction of the bar.

C. Cancellation of these errors by making modifications in one or a number of resistance gages in order to produce a modification of the above-mentioned angle $\theta$.

The present Applicant has in fact found that it was possible to compute the relative errors of the transducer arising from displacements of the applied force as a function of the angle $\theta$ formed between the resistance gages and the resilient bar.

It is consequently possible to cancel these errors by making modifications in one or a plurality of resistance gages, the effect thereby achieved being to modify the angle $\theta$ aforesaid.

The method in accordance with the invention thus calls for a single sequence of operations involving solely a modification of the angle $\theta$ formed by one or a number of resistance strain gages, with the result that the force transducer delivers a signal which remains strictly proportional to the force to be measured, irrespective of the point of application of this force relatively to the bar.

In view of the fact that the method produces a modification in only one parameter of the resistance gages, this method is readily automatable or adaptable to automatic operation.

It has been established by the present Applicant that the errors of the transducer are a function of the angle $\theta$ aforesaid in accordance with the following relations:

$$e_x = e_{x_0} + 1/C_x \left[\Sigma\right] \cos 2\theta$$

$$e_z = e_{z_0} + 1/C_z \left[\Sigma\right] \sin 2\theta$$

where $e_x$ and $e_z$ are the errors due to a displacement of the force (P) applied respectively along an axis $O_x$ of the bar and along an axis $O_z$ perpendicular to said bar axis and to the applied force P, $e_{x_0}$ and $e_{z_0}$ are the initial errors determined during the step which involves initial characterization of the transducer, $C_x$ and $C_z$ are known constants which are established by design and by the conditions of initial characterization of the transducer.

By means of these relations, it is therefore possible to compute the correction to be made in the angle $\theta$ for cancelling the aforementioned errors $e_x$ and $e_z$.

It is then only necessary to develop an industrial and automatable method for making this correction of the angle $\theta$ in the resistance gages.

According to another aspect of the invention, the resistance-gage force transducer provided by the invention and comprising a resilient bar such that one end of said bar is intended to be attached to a stationary support and the other end is subjected to the force to be measured, said bar being adapted to carry resistance gages electrically connected to each other so as to form a measuring bridge for delivering an electrical signal which is a function of the force applied to said end of the bar, said transducer being so adjusted as to ensure that the signal is proportional to the applied force while being insensitive to the torsional and flexural couples generated by the displacements of the point of application of the force to be measured, is distinguished by the fact that the angle $\theta$ formed between one and a plurality of resistance gages and the longitudinal direction of the bar satisfies the following relations:

$$e_x = e_{x_o} + 1/C_x \left[\overline{\underline{\Sigma}}\right] \cos 2\theta = 0$$

$$e_z = e_{z_o} + 1/C_z \left[\overline{\underline{\Sigma}}\right] \sin 2\theta = 0$$

where
- $e_x$ and $e_z$ are the errors due to a displacement of the force applied respectively along the axis $O_x$ of the bar and along an axis $O_z$ perpendicular to said axis and to the applied force,
- $e_{x_o}$ and $e_{z_o}$ are the initial errors determined during a step which involves initial characterization of the transducer,
- $C_x$ and $C_z$ are known constants established by design and by the conditions of said initial characterization.

BRIEF DESCRIPTION OF THE DRAWINGS

Other features of the invention will be more apparent upon consideration of the following description and accompanying drawings, wherein:

FIG. 4 is a schematic end view of the force transducer and of the plate;

FIG. 5 is a plan view of a resistance strain gage which has been modified in accordance with one of the embodiments of the method provided by the invention;

FIG. 6 is a view which is similar to FIG. 5 and relates to another embodiment of the method;

FIG. 7 is a plan view of four resistance strain gages each comprising a principal resistor and two additional resistors in series and forming an angle with the principal resistor;

FIG. 8 is a view which is similar to FIG. 7 and relates to another example of construction.

DESCRIPTION OF THE PREFERRED EMBODIMENTS

Figure 1:
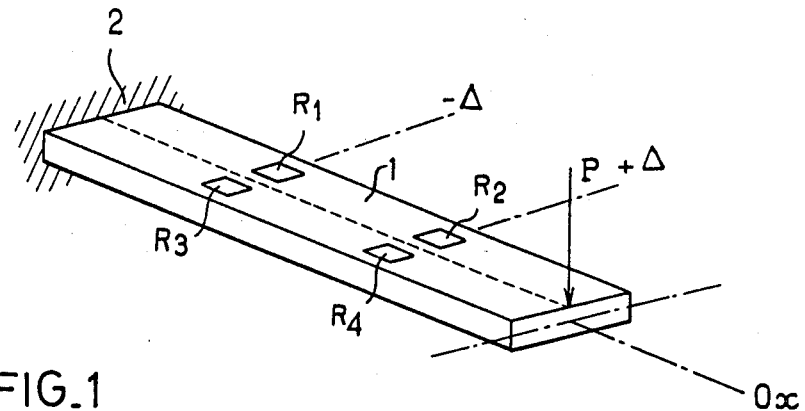
FIG. 1 is a view in perspective showing a force transducer in accordance with the invention, said transducer being attached to a stationary support.

FIG. 1 illustrates a resilient bar 1 of constant rectangular cross-section which is attached to a stationary support 2. The end of said bar 1 remote from the support 2 is subjected to a force P to be measured, said force being perpendicular to the axis $O_x$ of said bar.

Figure 2:
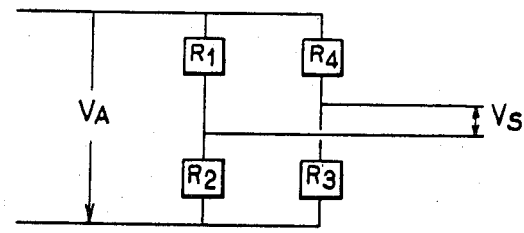
FIG. 2 is a diagram showing the measuring bridge formed by the resistance strain gages of the transducer.

Four resistance strain gages $R_1$, $R_2$, $R_3$, $R_4$ are placed on said bar 1 and connected electrically to each other so as to form a measuring bridge (as shown in FIG. 2) which is supplied with a voltage $V_A$ and delivers an output signal $V_S$.

It has been found by experience that the ratio of the output signal to the supply signal of a transducer of this type is of the form:

$$V_S/V_A = AP[a + bX + cZ] + z$$

Figure 3:
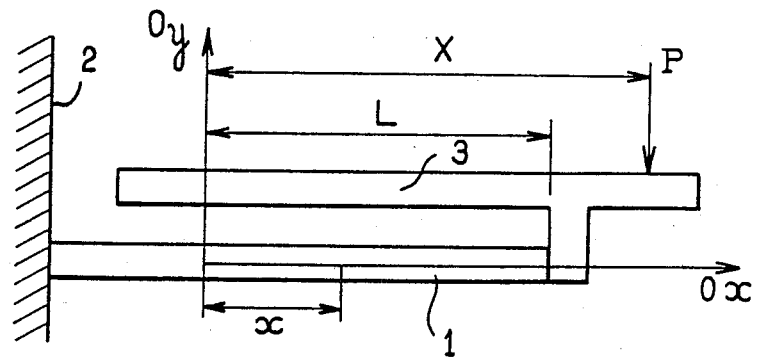
FIG. 3 is a schematic side view of the force transducer to which is attached a plate for application of the force to be measured.

In this relation, the terms PX and PZ are the parasitic flexural and torsional couples produced by the position of the force P on a plate 3 which extends in a direction parallel to the bar 1 and is attached to that end of this latter which is remote from the stationary support 2 (as shown in FIGS. 3 and 4).

The letter z is a constant term defining the unbalance of the measuring bridge when no applied force is present.

The parasitic signals APbX and APcZ have a large number of different causes which can be grouped together under the following main headings:
metallurgical heterogeneity within the bar 1 or within the gages $R_1 \ldots R_4$,
errors in position-location of the gages,
parasitic resistances in the measuring bridge,
finite dimensions of the bar 1.

The many different causes of error reduce any prospect of obtaining a perfect transducer directly, that is to say a transducer in which b and c are zero and in which, in addition, z is equal to 0 or has a specified value.

The principle which forms the basis of the method in accordance with the invention will first be described.

Consider by way of example a thin resistor of length L, of width l and of thickness t bonded by its surface L.1 to a deformable substrate such as a resilient bar. The variation in value of resistance of this resistor is:

$$\frac{\Delta R}{R} = \frac{\Delta \rho}{\rho} + \frac{\Delta L}{L} - \frac{\Delta l}{l} - \frac{\Delta t}{t}$$

Moreover, the variation in resistivity $\Delta \rho / \rho$ is related to the variation in volume of the resistor $\Delta V/V$ by the Bridgman relation:

$$\frac{\Delta \rho}{\rho} = C \frac{\Delta V}{V} = C \left( \frac{\Delta L}{L} + \frac{\Delta l}{l} + \frac{\Delta t}{t} \right)$$

whence $$\frac{\Delta R}{R} = (C + 1) \frac{\Delta L}{L} + (C - 1) \frac{\Delta l}{l} + (C - 1) \frac{\Delta t}{t}$$

Since the resistor is very thin and bonded to the substrate, $\Delta L/L$ and $\Delta l/l$ are imposed by the deformation of the substrate; these deformations give rise to stresses $\sigma_L$ and $\sigma_l$ in the resistor. On the other hand, the external surface of the resistor is free to move, and we have $\sigma_t = 0$.

Hooke's law in the resistor permits evaluation of $\Delta t/t$, by means of the following relations:

$$\frac{\Delta L}{L} = \frac{1}{E}(\sigma_L - \mu \sigma_l - \mu \sigma_t) = \frac{1}{E}(\sigma_L - \mu \sigma_l)$$

$$\frac{\Delta l}{l} = \frac{1}{E}(\sigma_l - \mu \sigma_t - \mu \sigma_L) = \frac{1}{E}(\sigma_l - \mu \sigma_L)$$

$$\frac{\Delta t}{t} = \frac{1}{E}(\sigma_t - \mu \sigma_L - \mu \sigma_l) = -\frac{\mu}{E}(\sigma_L + \sigma_l)$$

The first two relations yield:

$$\sigma_L + \sigma_l = \frac{E}{(1-\mu)}\left(\frac{\Delta L}{L} + \frac{\Delta l}{l}\right)$$

The third:

$$\frac{\Delta l}{l} = -\frac{\mu R}{1 - \mu R}\left(\frac{\Delta L}{L} + \frac{\Delta l}{l}\right)$$

$\nu R$ = Poisson constant of the resistor.
Thus:

$$\frac{\Delta R}{R} = (C+1)\frac{\Delta L}{L} + (C-1)\frac{\Delta l}{l} -$$

$$\frac{\mu R}{1-\mu R}(C-1)\left[\frac{\Delta L}{L} + \frac{\Delta l}{l}\right]$$

$$\frac{\Delta R}{R} = \left[C - (C-1)\frac{\mu R}{1-\mu R}\right]\left[\frac{\Delta L}{L} + \frac{\Delta l}{l}\right] +$$

$$\frac{\Delta L}{L} - \frac{\Delta l}{l}$$

Now if the length L of the resistor makes an angle $\theta$ with the principal direction $O_x$ of the bar, the state of plane deformation of which is specified by its three components: $\epsilon_x\ \epsilon_z\ \gamma_{xz}$, the conventional formulae give the deformations: $\Delta L/L$ and $\Delta l/l$ in the resistor, and we find:

$$\frac{\Delta L}{L} = \epsilon L = \epsilon x \cos^2\theta + \gamma_{xz}\sin\theta\cos\theta + \epsilon_z \sin^2\theta$$

$$\frac{\Delta l}{l} = \epsilon l = \epsilon x \cos^2\left(\theta + \frac{\pi}{2}\right) +$$

$$\gamma_{xz}\sin\left(\theta + \frac{\pi}{2}\right)\cos\left(\theta + \frac{\pi}{2}\right) + \epsilon_z \sin^2\left(\theta + \frac{\pi}{2}\right)$$

$$\epsilon l = \epsilon x \sin^2\theta - \gamma_{xz}\sin\theta\cos\theta + \epsilon_z \cos^2\theta$$

In consequence:

$$\frac{\Delta L}{L} + \frac{\Delta l}{l} = \epsilon x + \epsilon z$$

$$\frac{\Delta L}{L} - \frac{\Delta l}{l} = (\epsilon x - \epsilon z)\cos 2\theta + \gamma \sin 2\theta$$

$$\frac{\Delta R}{R} = \left(c - (c-1)\frac{\mu R}{1-\mu R}\right)(\epsilon x + \epsilon z) +$$

$$(\epsilon x - \epsilon z)\cos 2\theta + \gamma \sin 2\theta$$

By virtue of conventional considerations in regard to strength of materials, the surface deformations $\epsilon x\ \epsilon z\ \gamma xz$ at the abscissa x of the bar 1 (see FIGS. 3 and 4) can be expressed as a function of the forces applied to its free end: transverse load P, bending moment $P(X-L)$, torsional moment PZ, we have:

$$\epsilon x = Py/EI(X-x)$$

$$\epsilon z = -\mu Pv/EI(X-x)$$

$$\gamma = Pv/C \cdot Z$$

wherein:

EI: flexural rigidity of bar 1
C: torsional rigidity of bar 1
2 v: thickness of bar 1
L: length of bar 1
$\mu$: Poisson constant of bar 1
hence:

$$\epsilon x + \epsilon z = AP(1-\mu)(X-x)$$

$$\epsilon x - \epsilon z = AP(1+\mu)(X-x)$$

$$\gamma = AP \cdot BZ$$

($A = v/EI$ and $B = EI/C$ characterize the bar 1).

Surface deformations may be expressed in a more detailed manner. The simple expressions given above, however, suffice to gain an understanding of the method.

The variation in value of a resistor which is bonded to the loaded bar 1 then becomes:

$$\frac{\Delta R}{R} = r = AP\left[\left(c - (c-1)\frac{\mu R}{1-\mu R}\right)(1-\mu)(X-x) + \right.$$

$$\left. (1+\mu)(X-x)\cos 2\theta + BZ \sin 2\theta \right]$$

$$r = AP[G(X-x) + (1+\mu)(\cos 2\theta - 1)(X-x) + BZ \sin 2\theta]$$

$$G = \left(C - (C-1) \times \frac{\mu R}{1-\mu R}\right)(1-\mu) + 1 + \mu$$

is the longitudinal gage coefficient usually considered in extensometry; it is equal to 2 when the Bridgman coefficient $$C = \frac{\Delta\rho/\rho}{\Delta v/v}$$

is equal to 1, which is approximately the case with many of the usual alloys.

The expression given in the foregoing applies to isotropic piezoresistive materials characterized by $C > 1$.

The signal of a bridge constituted by four resistors having equal ohmic values $R_1, R_2, R_3, R_4$ and bonded to the bar (A,B) is:

$$S = \frac{VS}{VA} = \frac{1}{4}(r_1 - r_2 + r_3 - r_4) = \frac{1}{4}\boxed{\Sigma}\ r_i$$

with $r_i = \frac{\Delta R_i}{R_i} = \frac{AP}{4}[G\ \boxed{\Sigma}\ (X-x) +$ $$(1+\mu)\ \boxed{\Sigma}\ (\cos 2\theta - 1)(X-x) + BZ\ \boxed{\Sigma}\ \sin 2\theta]$$

Considering the odd-numbered disconnected resistors $R_1, R_3$ having as abscissa $-\Delta$ and the even-numbered resistors $R_2, R_4 + \Delta$ as indicated in FIG. 1, the signal is:

$$S = AP/4[4G\Delta + (1+\mu)\Delta\Sigma(\cos 2\theta - 1) + (1+\mu)X\boxed{\Sigma}\cos 2\theta + BZ\boxed{\Sigma}\sin 2\theta]$$

in this expression and in those which will be employed hereinafter:

$\boxed{\Sigma}$ (a) represents the sum $a_1+a_2+a_3+a_4$ $\boxed{\Sigma}$ (a) represents the sum in the bridge:

$a_1-a_2+a_3-a_4.$

If all the angles $\theta$ are zero, the signal S is reduced to $AP/4 \ 4G\Delta$ The portion of the signal related to the angles $\theta$ is:

$S\theta = AP/4[(1+\mu)\Delta\Sigma(\cos 2\theta - 1) + (1+\mu)x \boxed{\Sigma} \cos 2\theta + BZ \boxed{\Sigma} \sin 2\theta]$ By superimposing the influence of the angles $\theta$, isolated in the foregoing, on the signal of a real transducer which, as shown by experience, is of the form:

$AP/4[a+bX+cZ]+z$ $a \simeq 4G\Delta$
$bX \ll a$ error related to the position X of P
$cZ \ll a$ error related to the position Z of P
$z$ zero error of the bridge we obtain:

$S = AP/4[4G\Delta + (1+\mu)\Delta\Sigma(\cos 2\theta - 1) + (b+(1+\mu) \boxed{\Sigma} \cos 2\theta)X + (c+B \boxed{\Sigma} \sin 2\theta)Z] + z + \Delta z$ $S = AP/4[4G\Delta + (1+\mu)\Delta\Sigma(\cos 2\theta - 1) + (b+(1+\mu) \boxed{\Sigma} \cos 2\theta)X + (C+B \boxed{\Sigma} \sin 2\theta)Z] + z + \Delta z$ This expression shows that modifications of the angles $\theta$ in resistors of suitable parity make it possible to cancel the coefficients of X and of Z at the cost of a small signal loss $(1+\mu)\Delta\Sigma(\cos 2\theta - 1)$ and of a variation in the zero $\Delta z$ (which can in any case be compensated as will be seen later). Said expression constitutes the basis of the method which will now be described.

Although the initial angles $\theta$ can in principle be of any value, it is clearly advantageous to choose angles of zero value in order to ensure an initially zero signal loss $(1+\mu)\Delta\Sigma(\cos 2\theta - 1)$.

The method is not directly concerned with the origin of the initial errors b, c, z: it merely notes their existence and cancels them in a single operational sequence involving the following steps:
initial characterization of the transducer,
adjustment of resistances of the strain-gage bridge,
final checking of the transducer.

At the end of this sequence, the transducer is an integrated quadrupole component which ensures the function $S=kP$ (k=constant) within specified tolerance limits. At the time of initial characterization of the transducer, the initial errors of this latter are determined by subjecting the bar to predetermined forces applied successively to the plate or like device at two points which are symmetrical with respect to the center of the strain-gage bridge in the longitudinal axis of the bar and at two points which are also symmetrical with respect to the aforesaid center and located on an axis perpendicular to the longitudinal axis aforesaid.

The relative error arising from an eccentric displacement X of P on the plate 3 along the axis Ox is:

$e_x = \frac{bX}{4G\Delta} + \frac{(1+\mu)X}{4G\Delta} \boxed{\Sigma} \cos 2\theta = e_{x_0} + \frac{1}{C_x} \boxed{\Sigma} \cos 2\theta.$ The relative error arising from an eccentric displacement Z of P on the plate 3 along the axis Oz is:

$e_z = \frac{cZ}{4G\Delta} + \frac{BZ}{4G\Delta} \boxed{\Sigma} \sin 2\theta = e_{z_0} + \frac{1}{C_z} \boxed{\Sigma} \sin 2\theta$ Adjustment of the transducer consists:
in cancelling ex: $\boxed{\Sigma} \cos 2\theta = -C_x e_{x_0}$
in cancelling ez: $\boxed{\Sigma} \sin 2\theta = -C_z e_{z_0}$
in cancelling or adjusting to the desired value the zero: $z + \Delta z$.

The initial errors $ex_O$ and $ez_O$ are known by means of the initial characterization of the transducer. Cx and Cz are known and established by design (G, $\Delta$, B, $\mu$) and by the conditions of characterization (X, Z).

The practical application of the principle of adjustment stated in the foregoing must ensure independence of the adjustments:

$\boxed{\Sigma} \cos 2\theta = -Cxex_o$ and $\boxed{\Sigma} \sin 2\theta = -Czez_o$ and must make provision for industrial means with a view to varying the angles $\theta$. These two considerations will hereinafter be dealt with successively.

The two following methods are proposed for ensuring independence of adjustments.

FIRST METHOD

Starting from zero angles $\theta$, if an angle $d\theta$ is formed on a resistor $R_1$, $R_2$, $R_3$ or $R_4$ and the values of $\sin 2d\theta$ and $\cos 2d\theta$ are modified simultaneously, ez and ex vary simultaneously, which usually precludes any possibility of obtaining ex=ez=0.

Independence of the adjustments ex=0 and ez=0 is ensured by partitioning each adjustment so that one-half is applied to a resistor modified by the angle $+d\theta$ and not to another resistor modified by the angle $-d\theta$.

In the case of the adjustment ex=0, the modified resistors have the same parity.

In the case of the adjustment ez=0, the modified resistors have different parities.

Adjustment ex=0
Initial situation:

$\boxed{\Sigma} \cos 2\theta = \cos 0 - \cos 0 + \cos 0 - \cos 0 = 1-1+1-1$

One-half of the error $ex_0$ is compensated by modifying a resistor by $+d\theta_x$:

$\boxed{\Sigma} \cos 2\theta = \pm(\cos 2d\theta_x + 1)\mp(1+1) = \pm(\cos 2d\theta_x - 1) = -Cxex_0/2$ The other half of $ex_0$ is compensated by modifying the resistor having the same parity by $-d\theta_x$.

$\boxed{\Sigma} \cos 2\theta = \pm(\cos 2d\theta_x + \cos 2(-d\theta_x))\mp(1+1) = \pm 2(\cos 2\theta_x - 1) = -Cxex_0$ $e_x = e_{x_0} + 1/Cx \boxed{\Sigma} \cos 2\theta = e_{x_0} + 1/Cx(-C_x e_{x_0}) = 0$ The error $e_x$ is cancelled and the consequential effect on $e_z$ is zero:

$$e_z = e_{z0} + 1/C_z[\pm(\sin 2d\theta_x + \sin 2(-d\theta_x)) \pm (0+0)] = e_{z0}$$

Adjustment $e_z = 0$
Initially: $\Sigma$ $\sin 2\theta = 0 - 0 + 0 - 0$
First half: $\pm[\sin 2d\theta_z] \mp (0-0) = \pm \sin 2d\theta_z = -C_z e_{z0}/2$
Second half: $\pm[\sin 2d\theta_z - \sin 2(-d\theta_z)] \mp (0-0) = \pm 2 \sin 2d\theta_z = -C_z e_{z0}$ $e_z$ is now zero and the repercurssion on $e_x = 0$ already achieved is also zero:

$$1/C_x[\pm(\cos 2d\theta_z - \cos 2(-d\theta_z))] = 0$$

the two adjustments can be performed in any order
choice of resistors to be adjusted ($\pm$ signs in the expressions given above):
Adjustment $e_x = 0$:
if $e_{x0} > 0$, $\Sigma$ $\cos 2\theta$ must be negative:
the odd-numbered resistors are therefore modified, $\cos 2d\theta_x - 1$ is $<0$
if $e_{x0} < 0$, $\Sigma$ $\cos 2\theta$ must be positive:
the even-numbered resistors are modified: $-(\cos 2d\theta_x - 1)$ is $>0$.
Adjustment $e_z = 0$:
if $e_{z0} > 0$, $\Sigma$ $\sin 2\theta$ must be negative:
an even-numbered resistor is modified by $+d\theta_z$ and an odd-numbered resistor is modified by $-d\theta_z$
if $e_{z0} < 0$, $\Sigma$ $\sin 2\theta$ must be positive:
an odd-numbered resistor is modified by $+d\theta_z$ and an even-numbered resistor is modified by $-d\theta_z$.
Values of the angles $d\theta_x$ and $d\theta_z$:

$$\cos 2d\theta_x - 1 \cong -\frac{(2d\theta_x)^2}{2} = C_x \frac{|e_{x0}|}{2} \quad d\theta_x \cong \left(\frac{C_x|e_{x0}|}{4}\right)^{\frac{1}{2}}$$

$$\sin 2d\theta_z \cong 2d\theta_z = C_z \frac{|e_{z0}|}{2} \quad d\theta_z \cong \frac{C_z|e_{z0}|}{4}$$

Orders of magnitude:
with $G=2$ and $X/\Delta = Z/\Delta = 3$, $C_x \cong 2$, $C_z \cong 3$ and $e_{x0} = e_{z0} = 0.03$.
The method of partitioned adjustment described in the foregoing therefore entails the need to form angles:

$$d\theta_x = (2 \cdot 0.03/4)^{\frac{1}{2}} = 0.12 \text{ rad}$$

$$d\theta_z = 3 \cdot 0.03/4 = 0.02 \text{ rad}$$

SECOND METHOD

If a systematic signal loss is found acceptable, it is possible to obtain virtual independence of adjustment without any need to partition these latter as mentioned earlier (each adjustment will be carried out on one resistor alone) by placing in each group having the same parity a resistor at $\theta = 0$ which is specialized in the adjustment $e_z = 0$ and a resistor at $\theta = \pi/4$ which is specialized in the adjustment $e_x = 0$.

All the adjustments are then performed by the function $\sin 2(0+d\theta)$ and all the repercussions are in $\cos 2(0+d\theta)$.

Initial situation:

$\Sigma$ $\cos 2\theta = \cos 0 - \cos 0 + \cos 2\pi/4 - \cos 2\pi/4 = 0$ $\Sigma$ $\sin 2\theta = \sin 0 - \sin 0 + \sin 2\pi/4 - \sin 2\pi/4 = 0$ This configuration does not introduce any error $e_x$ in $e_z$.
Adjustment $e_x = 0$ on the resistors at $\pi/4$:
A sign is chosen for $d\theta_x$ and there is then determined the parity of the resistor to be readjusted as a function of the sign of $e_{x0}$ and of the sign chosen for $d\theta_x$; $d\theta_x$ is then formed on the suitable resistor:

$\Sigma$ $\cos 2\theta = 1 - 1 \pm \cos 2(\pi/4 + d\theta_x) = \mp \sin 2d\theta_x = -C_x e_{x0} \rightarrow d\theta_x \cong C_x e_{x0}/2$ the repercussion on $e_z$ is very small:

$$1/C_z[0 - 0 \pm \sin 2(\pi/4 + d\theta_x) \mp \sin 2(\pi/4)] = \pm 1/C_z(\cos 2d\theta_x - 1) = \pm(C_x e_{x0})^2/2C_z$$

$e_{z0}$ becomes $e_{z1} = e_{z0} \pm (C_x e_{x0})^2/2C_z$

A measurement of $e_{z1}$ is then performed and this latter is taken as a datum for the adjustment $e_z = 0$.
Adjustment $e_z = 0$ on the Resistors at $0°$.
The parity and the sign of $d\theta_z$ are chosen as a function of $e_{z1}$ and $d\theta_z$ is formed on the suitable resistor:

$\Sigma$ $\sin 2\theta = \pm(\sin 2d\theta_z - 0) \mp (1-1) = \sin 2d\theta_z = -C_z e_{z1} \rightarrow d\theta_z = C_z e_{z1}/2$ the repercussion on $e_x = 0$ already adjusted is very small.

$$1/C \Sigma \cos 2\theta 32 \, 1/C_x[\pm(\cos 2d\theta_z - 1) + \cos \pi/2 - \cos \pi/2] = 1/C_x(\cos 2d\theta_z - 1) \cong \pm(C_z e_{z1})^2/2C_x$$

Since the order of magnitude of the repercussions is known at the time of initial characterization of the transducer, the program can be written in such a manner as to minimize the residual error. This method systematically produces a relative signal loss equal to:

$$\frac{(1+\mu)\Delta\Sigma(\cos 2\theta - 1)}{4G\Delta} = \frac{1+\mu}{4G}(-2) = -\frac{1+\mu}{2G}$$

Value of the angles:
The adjustment $e_x = 0$ results in formation of an angle $d\theta_x = C_x e_{x0}/2$
The adjustment $e_z = 0$ results in formation of an angle $d\theta_z = C_z e_{z1}/2$
and leaves a maximum repercussion
namely $(C_x e_{x0})^2/2C_z$ on the error $e_x$
and $\sim(C_z e_{z0})^2/2C_x$ on the error $e_z$
The order of adjustments can be chosen by programming so as to leave only the smaller of the two. This latter in any case tends towards zero after a second adjustment cycle.

After the corrections to be made in the angles $\theta$ have been determined by calculation and independence of the adjustments ($e_x = e_z = 0$) has been ensured, either of the two methods described hereinafter is employed for the purpose of modifying the initial angles $\theta$ of the resistance strain gages.

The first method applies exclusively to thin-film or thick-film resistors.

This method consists in using a laser beam, for example, in order to cut a parallelogram in the initially rectangular resistance gages $R_1, \ldots R_4$. As shown in FIG. 5, said parallelogram is defined by two parallel grooves $l_1$ and $l_2$, the electrical length $L_1$ of which really forms the angle $d\theta_x$ or $d\theta_z$ with respect to the initial orientation $0_x$, said angle being determined by the aforementioned expressions as a function of the initial characterization.

As shown in FIG. 6, it is also possible to form notches $e_1, e_2 \ldots$ in the longitudinal edges of the resistance gages $R_1, \ldots R_4$, said notches being transverse to the direction $0_x$ or $0_z$ so as to ensure that the resultant electrical length $L_1$ forms with the initial direction $0_x$ or $0_z$ the angle $d\theta_x$ or $d\theta_z$ which is determined by the relations given earlier.

The maximum sensitivity of the error $e_x$ or $e_z$ to the variation of angle $d\theta_x$ or $d\theta_z$ is $$\frac{de}{d\theta} = \frac{1}{C_x \text{ or } C_z} \cdot 1$$

namely, as an order of magnitude, $\frac{1}{2}d\theta$

Checking of errors to within an accuracy of 0.001 therefore calls for angular checking which is accurate to 0.002 rad. Commercially available laser adjustment machines can readily attain this degree of accuracy.

With the orders of magnitude previously employed, the maximum variation of the zero produced by the adjustments $e_x = 0$ and $e_z = 0$ is $$|\Delta z| = \tfrac{1}{2}(L/1 d\theta) = 0.06$$

(with $L/1 = 1$)
in the case of the method of partitioned adjustment.
$$|\Delta z| = \tfrac{1}{4}L/1(d\theta_x + d\theta_z) = 0.02$$

(with $L/1 = 1$)
in the case of the method of specialized resistors.

These variations are cancelled by conventional functional adjustment of a resistor having suitable parity along its transverse axis of symmetry in order to avoid modification of the angle.

The second method proposed consists in making use of resistance gages each formed by a principal resistor Ro which forms a predetermined angle with the longitudinal axis $O_x$ of the bar 1. Each principal resistor Ro is connected to additional resistors, Ra, Rb, ..., having a low ohmic value in comparison with that of the principal resistor Ro and forms a predetermined angle with the direction of the resistor Ro.

In order to cancel the errors $e_x$ and $e_z$, the ohmic value of one or a number of these additional resistors Ra, Rb is modified. The effect thereby achieved is to modify the virtual angle of the resistance gage with the axis $0_x$ of the bar 1.

This second method applies to all types of resistance gages (grids or layers) and is based on the following statement:

Considering a resistor formed by resistance elements in series $R = R_0 + R_1 + \ldots + R_n$, having the same abscissa x (in order to simplify the description which can in any case be transposed to parallel resistors):

$R_0$ forms the angle $\theta_0$ with the longitudinal axis of the bar 1 and $R_n$ forms the angle $\theta_n$.

$$r = \frac{\Delta R}{R} = \frac{\Delta R_0}{R} + \frac{\Delta R_1}{R} + \ldots +$$

$$\frac{\Delta R_n}{R} = \frac{R_0}{R} \frac{\Delta R_0}{R_0} + \frac{R_1}{R} \frac{\Delta R_1}{R_1} + \ldots +$$

$$\frac{R_n}{R} \frac{\Delta R_n}{R_n} = \rho_0 r_0 + \rho_1 r_1 + \ldots + \rho_n r_n = \Sigma \rho_i r_i$$

With the aid of the formula established earlier:

$r_i = AP[G(X-x) + (1+\mu)(X-x)(\cos 2\theta_i - 1) + BZ \sin 2\theta_i]$, we calculate:

$r = \Sigma \rho_i r_i = AP[G(X-x)\Sigma \rho_i + (1+\mu)(X-x)(\Sigma \rho_i \cos 2\theta_i - \Sigma \rho_i) + BZ\Sigma \rho_i \sin 2\theta_i]$ so that, by taking into account $$\frac{R_0}{R} + \frac{R_1}{R} + \ldots + \frac{R_n}{R} = \Sigma \rho_i = 1$$

$r = AP[G(X - x) +$ $(1 + \mu)(X - x)(\Sigma \rho_i \cos 2\theta_i - 1) + BZ \Sigma \rho_i \sin 2\theta_i]$ The sums of vectors $\Sigma \rho_i \cos 2\theta_i$, $\Sigma \rho_i \sin 2\theta_i$ are respectively proportional to $$\cos \operatorname{arctg} \frac{\Sigma \rho_i \sin 2\theta_i}{\Sigma \rho_i \cos 2\theta_i} \text{ and } \sin \operatorname{arctg} \frac{\Sigma \rho_i \sin 2\theta_i}{\Sigma \rho_i \cos 2\theta_i}$$

and perform the function of $\cos 2\theta$ and $\sin 2\theta$ in the formula of a single resistor.

The composite resistor $R = R_0 + R_1 + \ldots + R_n$ behaves as a single resistor having a virtual angle equal to:

$$\operatorname{arctg} \frac{\Sigma \rho_i \sin 2\theta_i}{\Sigma \rho_i \cos 2\theta_i}$$

A transducer equipped with resistors of this type can therefore be adjusted by modifying the virtual angles of these latter solely by conventional adjustment of the ratios of resistances $\rho_i$.

Two examples of configuration are given below:

Example 1

As indicated in FIG. 7, each resistance strain gage of the bridge is formed by a principal resistor $R_0$ having a weight $\rho$ which is close to 1 and forming a zero angle $\theta$ with $0_x$ so that $\sin 2\theta = 0$ and $\cos 2\theta = 1$, in series with a resistor $R_a$ having a weight $\rho' \ll 1$ and forming an angle $\theta' = \pi/4$ with $0_x$ so that: $\sin 2\theta' = 1$, $\cos 2\theta' = 0$ and with a resistor $R_b$ having a weight $\rho'' = \rho' \ll 1$ and forming an angle $\theta'' = -\pi/4$ with $O_x$ so that $\sin 2\theta'' = -1$, $\cos 2\theta'' = 0$. We calculate directly:

$\Sigma \rho_i \sin 2\theta_i = \rho \times 0 + \rho' \times 1 + \rho'' \times (-1) = \rho' - \rho''$ $\Sigma \rho_i \cos 2\theta_i = \rho \times 1 + \rho' \times 0 + \rho'' \times 0 = \rho = 1 - (\rho' + \rho'')$ The initial virtual angle $\operatorname{arctg} \rho' - \rho''/\rho$ is zero if $\rho' = \rho''$ in the case of each resistor.

$\Sigma(1-\rho'-\rho'')=\Sigma(\rho'-\rho'')$ and $\Sigma(\rho'-\rho'')$ are also zero in a bridge made up of four identical resistors and this configuration does not in itself produce any error of the type $e_x$ or $e_z$. Should any differences exist between the different values $\rho'$ and $\rho''$, the resultant errors are counted in $ex_0$ and $ez_0$ during the initial measurement.

Adjustment of the transducer consists in increasing the ratios $\rho'$ and $\rho''$ by $d\rho'$ and $d\rho''$ in order to obtain:

$$\Sigma(-d\rho'-d\rho'')=-C_x ex_0$$

and thus to cancel ex $$\Sigma(d\rho'-d\rho'')=-C_z ez_0$$

and thus to cancel ez.

The values $d\rho'$ and $d\rho''$ (which are necessarily positive) are employed both in ex and in ez.

As in the method of direct modification of the angles, independence of adjustments is ensured by distributing ("partitioning") them in two resistors (having the same parity in respect of $ex=0$ and having a different parity in respect of $ez=0$), one resistor being modified by $d\rho'$ and the other resistor being modified by $d\rho''$.

Adjustment $ex=0$:

$$\pm(d\rho'_x+d\rho''_x)=-C_x ex_0 \quad d\rho'_x=d\rho''_x=C_x|ex_0|/2$$

Repercussion on ez:

$$\pm 1/C_z(d\rho'_x-d\rho''_x)=0$$

Adjustment $ez=0$:

$$\pm(d\rho'_z-(-d\rho''_z))=-C_z ez_0 \quad d\rho'_z=d\rho''_z=C_z|ez_0|/2$$

Repercussion on ex:

$$\pm 1/C_x(d\rho'_z-d\rho''_z)=0$$

The sign of $ex_0$ determines the parity ($\pm$sign) of the adjusted group in order to produce $ex=0$.

The sign of $ez_0$ determines the combination (parity/angle) of the series resistor employed for producing $ez=0$.

In the method of direct subdivision of the angles explained earlier, it is possible to compute and to program the value of the angles $d\theta$ to be formed.

In the present method, the adjustment parameters are the ratios $\rho'$ and $\rho''$ which may not be accessible to measurement and may therefore not be programmable. In this case, the variations in these ratios $d\rho'$, $d\rho''$ are represented by the variations in the bridge zero which are always measurable.

The ratios $\rho'$, $\rho''$ have been defined by the series resistance/total resistance ratios, with the result that $$d\rho' = \frac{\Delta R'}{R + \Delta R'} \simeq \frac{dR'}{R} \text{ and } d\rho'' \simeq \frac{dR''}{R}$$

Moreover, the variation in the bridge zero is:

$$\Delta z = \tfrac{1}{4}\Sigma\left(\frac{dR}{R\text{ total}} + \frac{dR'}{R\text{ total}} + \frac{dR''}{R\text{ total}}\right)$$

$$\simeq \tfrac{1}{4}\Sigma(d\rho + d\rho' + d\rho'')$$

It is thus possible to program the values of $d\rho$ by means of variations of zero and to control the adjustments.

$ex=0$ produces a variation in zero$=\tfrac{1}{4}(C_x ex_0/2 + C_x ex_0/2)$ since two resistors having the same parity are adjusted.

$ez=0$ produces a variation in zero$=\tfrac{1}{4}(C_z ex_0/2 - C_z ez_0/2)$ since two resistors having a different parity are adjusted.

The uncertainty arising from the approximation $$d\rho' = \frac{dR'}{R+dR'} \simeq \frac{dR'}{R}$$

is removed if necessary by stopping the adjustment at 90% (for example) of the computed value, by making a new measurement of the errors and by computing a new modification of the zero.

After the adjustments $ex=0$ and $ez=0$, the zero (irrespective of its value) is brought to the specified value by a conventional functional adjustment of a principal resistor having a suitable parity.

Example II:

As indicated in FIG. 8, each resistance strain gage of the bridge is formed by a principal resistor $R_0$ having a weight $\rho$ which is close to 1 and forming a zero angle $\theta$ with $O_x$ so that $\sin 2\theta=0$, $\cos 2\theta=1$, in series with a resistor $R_a$ having a weight $\rho'<<1$ and forming an angle $\theta'=\pi/4$ with $O_x$ so that $\sin 2\theta'=1$, $\cos 2\theta'=0$, with a resistor $R_b$ having a weight $\rho''=\rho'$ and forming an angle $\theta''=-\pi/4$ with $O_x$ and $\sin 2\theta''=-1$, $\cos 2\theta''=0$ and with a resistor $R_c$ having a weight $\rho'''<<1$ and forming an angle $\theta'''=\pm\pi/2$ with $O_x$ so that $\sin 2\theta'''=0$, $\cos 2\theta'''=-1$.

We calculate directly:

$$\Sigma\rho_i\sin 2\theta_i = \rho x0 + \rho'x1 + \rho''x(-1) + \rho'''x0 = \rho' - \rho''$$

$$\Sigma\rho_i\cos 2\theta_i = \rho x1 + \rho'x0 + \rho''x0 + \rho'''x(-1) = \rho - \rho'''$$

$$= 1 - (\rho' + \rho'' + 2\rho''')$$

The initial virtual angle arctg $(\rho'-\rho''/\rho-\rho''')$ is zero if $\rho'=\rho''$ and a strain gage bridge constituted by four identical resistors of this type does not introduce any errors due to the configuration.

Adjustment of the transducer consists in setting:

$$\Sigma(1-(d\rho'+d\rho''+2d\rho''')) =$$

$$\Sigma(-d\rho'-d\rho''-2d\rho''') = -C_x ex_0$$

$$\Sigma(d\rho'-d\rho'') = -C_z ez_0$$

The resistors $R_c$ at 90° having a weight $\rho'''$ do not play any part in the adjustment $e_z=0$.

Independence of adjustments is therefore ensured if one adjusts in the following order: first of all $e_z=0$ by means of $\rho'$ or $\rho''$ (or both by partitioned adjustment), then $e_x=0$ by means of $\rho'''$, then the zero on a principal resistor $\rho$.

The case of the method of partitioned adjustment will first be studied.

In the relations:

$$\Sigma(d\rho'-d\rho'')=(d\rho'-d\rho'')_1-(d\rho'-d\rho'')_2+(d\rho'-d\rho'')_3-(d\rho'-d\rho'')_4$$

and $$\Sigma(-d\rho'-d\rho''-2d\rho''')=(-d\rho'-d\rho''-2d\rho''')_1-(-d\rho'-d\rho''-2d\rho''')_2+(-d\rho'-d\rho''-2d\rho''')_3-(-d\rho'-d\rho''-2d\rho''')_4,$$

$d\rho'_1$ and $d\rho'_3$, $d\rho''_1$ and $d\rho''_3$, $d\rho'_2$ and $d\rho'_4$, $d\rho''_2$ and $d\rho''_4$, $d\rho'''_1$ and $d\rho'''_3$, $d\rho'''_2$ and $d\rho'''_4$ perform the same function. There is consequently no objection to dispensing with the series resistors $R_a$, $R_b$, $R_{a1}$, $R_{b1}$, $R_{c3}$ and $R_{c4}$ having respectively the weights $\rho'_1$, $\rho''_1$, $\rho'_2$, $\rho''_2$, $\rho'''_3$ and $\rho'''_4$, for example.

The adjustment values then become:

$$\Sigma(d\rho'-d\rho'')=(d\rho'-d\rho'')_3-(d\rho'-d\rho'')_4=(d\rho'_3+d\rho''_4)-(d\rho''_3+d\rho'_4)$$

$$\Sigma(-d\rho'-d\rho''-2d\rho''')=-2(d\rho'''_1-d\rho'''_2)-(d\rho'_3-d\rho''_4)-(d\rho''_3-d\rho'_4)$$

The initial virtual angles of the four resistance gages of the bridge are zero. This configuration does not introduce in itself either an error of the type $e_x$ or $e_z$ or a signal loss.

The adjustment $e_z=0$ is obtained by:

$$\Sigma(d\rho'-d\rho'')=-C_z e_{z0}$$

by increasing $\rho''_3$ and $\rho'_4$ by the same quantity:

$$d\rho''_3=d\rho'_4=+C_z e_{z0}/2,$$

if $e_{z0}>0$ $$d\rho'_3=d\rho''_4=-C_z e_{z0}/2,$$

if $e_{z0}<0$
$e_x$ has not varied:

$$e_x=e_{x0}+1/c_x(C_z e_{z0}/2-C_z e_{z0}/2)=e_{x0}$$

During the first half of the adjustment ($d\rho''_3$), the zero varies approximately by:

$$\tfrac{1}{4}\Sigma d\rho''_3=C_z e_{z0}/2.4$$

and, during the second half, by:

$$\tfrac{1}{4}\Sigma d\rho'_4=-C_z e_{z0}/2.4$$

These variations make it possible to program the adjustment with, if necessary, one or a number of intermediate measurements $e_{z1} e_{z2} \ldots$.

After the adjustment $e_z=0$, the zero has reverted to its initial value.

The adjustment $e_x=0$ is then obtained by:

$$\Sigma(-2d\rho''')=-2(d\rho'''_1-d\rho'''_2)=-C_x e_{x0}$$

$\rho'''_1$ is increased (if $e_{x0}>0$) by $d\rho'''_1=C_x e_{x0}/2$
or $\rho'''_2$ is increased (if $e_{x0}<0$) by $d\rho'''_2=-C_x e_{x0}/2$ During this adjustment, the zero varies approximately by:

$$\tfrac{1}{4}\Sigma d\rho'''=\tfrac{1}{4}C_x e_{x0}/2$$

The new zero is cancelled or brought to the desired value by conventional functional adjustment of a principal resistor ($\theta=0$) having a parity determined by the sign of the new zero.

The configuration may be simplified even further and, instead of partitioning the adjustment $e_z=0$ as before, this adjustment may be performed on a single inclined resistor with, however, a greater zero correction at maximum value.

In the first of the adjustment values written earlier:

$$\Sigma(d\rho'-d\rho'')=(d\rho'_3+d\rho''_4)-(d\rho''_3+d\rho'_4)$$

$$\Sigma(-d\rho'-d\rho''-2d\rho''')=-2(d\rho'''_1-d\rho'''_2)-(d\rho'_3-d\rho''_4)-(d\rho''_3-d\rho'_4)$$

it is possible to suppress one element within each pair of brackets ($d\rho''_3$ and $d\rho''_4$ for example) without reducing the capacity of adjustment $e_z=0$.

The adjustment equations become:

$$\Sigma(d\rho'-d\rho'')=d\rho'_3-d\rho'_4=-C_z e_{z0}$$

$$\Sigma(-d\rho'-d\rho''-2d\rho''')=-2(d\rho'''_1-d\rho'''_2)-(d\rho'_3-d\rho'_4)=-C_x e_{x0}$$

$e_z=0$ is obtained by increasing
$\rho'_3$ by $-C_z e_{z0}$ if $e_{z0}<0$ or $\rho'_4$ by $C_z e_{z0}$ if $e_{z0}>0$ After this adjustment, $e_x$ has become $e_{x1}=e_{x0}+1/C_x \cdot C_z e_{z0}$ and the zero has varied by $\pm \tfrac{1}{4} C_z e_{z0}$.

$e_{x1}$ is measured (or calculated) and cancelled by:

$$d\rho'''_1-d\rho'''_2=\tfrac{1}{2}C_x e_{x1}=\frac{C_x e_{x0}+C_z e_{z0}}{2}$$

by increasing $\rho'''_1$ by $C_x e_{x1}/2$ if $e_{x1}>0$ or by increasing $\rho'''_2$ by $-C_x e_{x1}/2$ if $e_{x1}<0$ This adjustment $e_{x1}=0$ does not apply to $e_z=0$ already performed but produces a new variation of the zero by:

$$\tfrac{1}{4}\Sigma d\rho'''=\pm\tfrac{1}{4}\frac{C_x e_{x1}}{2}=\pm\frac{C_x e_{x0}+C_z e_{z0}}{2}$$

Whatever it may be, the new value of the zero is measured and then set at the desired value by conventional functional adjustment of a principal resistor ($\theta=0$) having a suitable parity determined by the sign of the zero.

As will be readily understood, all the calculations mentioned in the foregoing can be carried out by means of a computer which thus computes automatically the corrections to be applied to the gages.

What is claimed is:

1. A method for adjusting a resistance-gage force transducer (resistance gages $R_1$, $R_2$, $R_3$, $R_4$) comprising a resilient bar (1) attached at one end to a stationary support (2) and subjected at the other end to the force (P) to be measured, said bar (1) being adapted to carry resistance gages ($R_1, \ldots R_4$) electrically connected to each other so as to form a measuring bridge for delivering an electrical signal which is a function of the force applied to said other end of the bar, said transducer being adjustable by means of said method in such a manner as to ensure that said electrical signal is proportional to the applied force and insensitive to the torsional and flexural couples generated by the displacements of the point of application of the force (P) to be measured, said method being distinguished by the following steps:

A. Determination of the initial characteristics of the transducer,
B. Computation of the relative errors of the transducer arising from a displacement of the applied force (P) as a function of the angle $\theta$ formed between the resistance gages ($R_1, \ldots R_4$) and the longitudinal direction ($O_x$) of the bar,
C. Cancellation of these errors by making modifications in one or a number of resistance gages in order to produce a modification of the angle $\theta$ aforesaid.

2. A method according to claim 1, wherein the errors of the transducer are computed by means of the following relations:

$$e_x = e_{x_0} + 1/C_x \sum \cos 2\theta$$

$$e_z = e_{z_0} + 1/C_z \sum \sin 2\theta$$

where $e_x$ and $e_z$ are the errors due to a displacement of the force (P) applied respectively along the axis ($O_x$) of the bar (1) and along an axis ($O_z$) perpendicular to said bar axis and to the applied force (P), $e_{x_0}$ and $e_{z_0}$ are the initial errors determined during the step which involves initial characterization of the transducer, $C_x$ and $C_z$ are known constants which are established by design and by the conditions of initial characterization of the transducer, and wherein the corrections to be made in the angle $\theta$ of each resistor are determined from the relations given above in order to cancel the errors $e_x$ and $e_z$.

3. A method according to claim 2 in which the resistance gages form a zero angle $\theta$ with the axis $O_x$ of the bar, wherein the error $e_x$ aforesaid is cancelled by applying to a resistance gage having a suitable parity a correction:

$$d\theta_x \cong (C_x|e_{x0}|/4)^{\frac{1}{2}}$$

and by applying a correction $-d\theta_x$ to the other gage having the same parity and the error $e_z$ is cancelled by applying to a gage having a suitable parity a correction:

$$d\theta_z \cong C_z|e_{z0}|/4$$

and by applying a correction $-d\theta_z$ to a gage having a different parity.

4. A method according to claim 2 in which the resistance gages comprise groups such that in each group having a same parity there is a gage forming an angle $\theta = 0$ and a gage forming an angle $\theta = \pi/4$, wherein the error $e_x$ is cancelled by applying to one of the gages $\theta = \pi/4$ a correction:

$$d\theta_x = C_x e_x O /2$$

and the error $e_z$ is cancelled by applying to a gage $\theta = 0$ a correction:

$$d\theta_z = C_z e_{z1}/2.$$

5. A method according to claim 3 in which the resistance gages ($R_1 \ldots R_4$) are constituted by resistive layers having the shape of rectangles and applied on the bar (1), wherein the angle $\theta$ of the resistance gages is corrected by cutting two parallel grooves ($l_1, l_2$) in said layers so as to form a parallelogram with the two opposite sides of the rectangle formed by each gage, said grooves being inclined with respect to the initial direction of said gages at the angle $d\theta_x$ or $d\theta_z$ determined by the relations given above.

6. A method according to claim 3 in which the resistance gages ($R_1, \ldots R_4$) are constituted by resistive layers having the shape of rectangles and applied on the bar (1), wherein the angle $\theta$ of said resistance gages is corrected by forming notches ($e_1, e_2, \ldots$) transversely in the longitudinal edges of said gages in order to ensure that the resultant electrical direction ($L_1$) of said gages forms the angle $d\theta_x$ or $d\theta_z$ with the initial direction, said angle being determined by the relations given above.

7. A method according to claim 6, wherein said grooves ($l_1, l_2$) or notches ($e_1, e_2, \ldots$) are cut by means of a laser beam.

8. A method according to claim 3 in which the resistance gages are formed by a principal resistor ($R_0$) which makes a predetermined angle with the longitudinal axis ($O_x$) of the bar (1), each principal resistor ($R_0$) being connected in series with an additional resistor ($R_a$, $R_b$) having a low ohmic value in comparison with the ohmic value of the principal resistor ($R_0$) and inclined at a predetermined angle $\theta$ with respect to said principal resistor, wherein the errors ($e_x$) and ($e_z$) are cancelled by modifying the ohmic value of one or a number of said additional resistors ($R_a$, $R_b$), the effect of said modification being to modify the virtual angle made between the resistance gage and the axis ($O_x$) of the bar (1).

9. A resistance-gage force transducer (resistance gages $R_1, \ldots R_4$) comprising a resilient bar (1) such that one end of said bar is intended to be attached to a stationary support (2) and the other end is subjected to the force (P) to be measured, said bar (1) being adapted to carry resistance gages ($R_1, \ldots R_4$) electrically connected to each other so as to form a measuring bridge for delivering an electrical signal which is a function of the force (P) applied to said other end of the bar, said transducer being so adjusted as to ensure that the signal is proportional to the applied force (P) and insensitive to the torsional and flexural couples generated by the displacements of the point of application of the force to be measured, wherein the angle $\theta$ formed between one or a plurality of resistance gages ($R_1, \ldots R_4$) and the longitudinal direction ($O_x$) of the bar (1) satisfies the following relations:

$$e_x = e_{x_0} + 1/C_x \sum \cos 2\theta = 0$$

$$e_z = e_{z_0} + 1/C_z \sum \sin 2\theta = 0$$

where $e_x$ and $e_z$ are the errors due to a displacement of the force (P) applied respectively along the axis ($O_x$) of the bar (1) and along an axis ($O_z$) perpendicular to said axis of the bar and to the applied force, $e_{x_0}$ and $e_{z_0}$ are the initial errors determined during a step which involves initial characterization of the transducer, $C_x$ and $C_z$ are known constants established by design and by the conditions of said initial characterization.

10. A force transducer according to claim 9 in which the resistance gages ($R_1, \ldots R_4$) are constituted by resistive layers having the shape of rectangles and applied on the bar (1), wherein the resistance gages ($R_1, \ldots R_4$) each have two parallel grooves ($l_1, l_2$) cut so as to form a parallelogram with the two opposite sides of the rectangle formed by each gage, said grooves being inclined with respect to the initial direction of said gages at an angle $d\theta_x$ or $d\theta_z$ which is determined by the following relations:

$$d\theta_x \simeq (C_x|e_{x0}|/4)^{\frac{1}{2}}$$

$$d\theta_z \simeq C_z|e_{z0}|/4.$$

11. A force transducer according to claim 9, wherein each resistance gage comprises a principal resistor ($R_0$) which makes a predetermined angle with the longitudinal axis ($O_x$) of the bar (1), each principal resistor ($R_0$) being connected in series with additional resistors ($R_a$, $R_b$, ...) having a low ohmic value in comparison with the ohmic value of the principal resistor ($R_0$) and inclined at a predetermined angle $\theta$ with respect to said principal resistor, and wherein the ohmic value of one or a number of said additional resistors has been modified, the effect of said modification being to modify the virtual angle made between the resistance gage and the axis ($O_x$) of the bar (1).

* * * * *